United States Patent [19]

Nishida et al.

[11] Patent Number: 4,696,587
[45] Date of Patent: Sep. 29, 1987

[54] EXPANSION COMPENSATING BEARING

[75] Inventors: Soji Nishida, Fujisawa; Nobuhiko Miyake, Yokohama, both of Japan

[73] Assignee: Nippon Seiko Kabushiki Kaisha, Tokyo, Japan

[21] Appl. No.: 881,896

[22] Filed: Jul. 3, 1986

[30] Foreign Application Priority Data

Jul. 16, 1985 [JP] Japan .................... 60-107630[U]

[51] Int. Cl.⁴ .................... F16C 27/04; F16C 43/04
[52] U.S. Cl. .................... 384/536; 384/582; 384/585
[58] Field of Search .............. 384/489, 490, 535, 536, 384/539, 561, 581, 582, 585, 903; 277/180, 184, 189, 214, 169, 168

[56] References Cited

U.S. PATENT DOCUMENTS 2,837,382  6/1958  Schaefer .................... 384/539
3,015,932  1/1962  McCard .................... 384/536 X

FOREIGN PATENT DOCUMENTS

57/53873  11/1982  Japan .

OTHER PUBLICATIONS

Machmer et al, "Thermal Expansion Compensation", IBM Technical Disclosure Bulletin, vol. 15, No. 9, Feb. 1973.

Kiessling, "Ball Bearing Mounts", IBM Technical Disclosure Bulletin, vol. 21, No. 2, Jul. 1978.

Primary Examiner—Stuart S. Levy
Assistant Examiner—Thomas R. Hannon
Attorney, Agent, or Firm—Shapiro and Shapiro

[57] ABSTRACT

In a bearing including an inner race and an outer race disposed concentrically, a plurality of rolling members interposed between the two races, and two ring members of synthetic resin axially spaced on the outer peripheral surface of the outer race and wherein a rotating member is inserted in the inner race and the outer race is fitted and held in a non-rotating member through the ring members, two circumferential grooves are provided at an interval in the outer peripheral surface of the outer race. Each of the circumferential grooves comprises a first portion located toward a respective axial end of the outer race and whose bottom surface comprises an arcuate surface of a single radius, and a second portion located more toward the opposite axial end than the first portion and being narrower and shallower than the first portion. The first and second portions are formed continuously to each other, the ring members are closely held in the respective circumferential grooves by injection-molding synthetic resin, and the outer peripheral surface of each of the ring members protrudes radially outwardly more than the outer peripheral surface of the outer race.

13 Claims, 2 Drawing Figures

EXPANSION COMPENSATING BEARING

BACKGROUND OF THE INVENTION

1. Field of the Invention

This invention relates to improvements in a bearing, in particular to an expansion compensating bearing. The expansion compensating bearing is a bearing which comprises an inner race and an outer race disposed concentrically, rolling members interposed between the two races, and synthetic resin rings mounted on the outer race. The outer race is held through the resin rings by a housing (for example, made of aluminum) greater in coefficient of linear expansion than the outer race so that even if heat is applied to the housing to expand it, the variation in the relation of fit between the housing and the outer race is minimized (the outer race is prevented from rotating relative to the housing).

2. Related Background Art

Various expansion compensating bearings of this type have therefore been proposed and some of them have been put into practical use. For example, Japanese Utility Model Publication No. 53873/1982 discloses a structure in which synthetic resin is injection-molded in a belt-like form so as to protrude from the outer peripheral surface of the outer race of the bearing by a predetermined dimension. The resin is molded in two concave circumferential grooves juxtaposed axially in the outer peripheral surface of the outer race which provides a fitting surface relative to a housing. In this prior art, particularly the axially outer corner of the bottom of each of the concave circumferential grooves is formed into a wedge shape, and the bottom of the wedge-shaped portion is made into a curved surface. The axially inner corner is also curved, but has no wedge shape, and its radius is made greater than the radius of the curved surface.

In the above-described conventional circumferential groove configuration, the wedge-shaped portion is formed at the corner of the groove bottom and therefore, the reaction against the turn-up during incorporation is small. Also the groove bottom has corners and thus, the strength of the outer race may not always be sufficient. Also, there has been a disadvantage in that the cutting tool for working the circumferential grooves, particularly the cutting edge portion for working the wedge portion, is liable to be damaged.

SUMMARY OF THE INVENTION

The present invention intends to eliminate the above-noted disadvantages peculiar to the prior art and to provide an expansion compensating bearing in which the turn-in of synthetic resin and the reduction in the strength of the outer race during the incorporation of the outer race can be prevented and at the same time, damage to the cutting tool during the working of the circumferential grooves can be prevented.

In the expansion compensating bearing of the present invention, two circumferential grooves in which belt-like synthetic resin is closely held and which are juxtaposedly provided in the outer race are formed by an inclined groove (a first portion), whose bottom is of a semicircular shape of a relatively great radius and which opens obliquely outwardly, and an L-shaped stepped groove (a second portion) formed in the outer peripheral surface of the outer race and which is continuous to the inner side wall of the inclined groove. That is, there is no corner in the groove bottom and the reduction in strength of the outer race caused by the formation of the circumferential grooves can thus be minimized. Also, the catching portion for preventing the turn-up of synthetic resin rings closely held on the outer race by injection molding is formed not on the groove bottom but at the entrance portion to which the greatest force is applied during incorporation, and therefore, the reaction against turn-in is great and the danger of turn-up is reduced more greatly.

Further, the circumferential grooves do not comprise inclined grooves alone, but comprise a combination of an inclined groove and a stepped groove. Therefore, the area of intimate contact of the synthetic resin rings with the circumferential grooves is great and the strength of intimate contact increases, whereby the effect of preventing loosening and the aforementioned turn-up is further improved.

DESCRIPTION OF THE PREFERRED EMBODIMENT

An embodiment of the present invention will hereinafter be described with reference to FIGS. 1 and 2, but it should be understood that the present invention is never restricted thereto and various improvements therein are possible as required.

Figure 1:
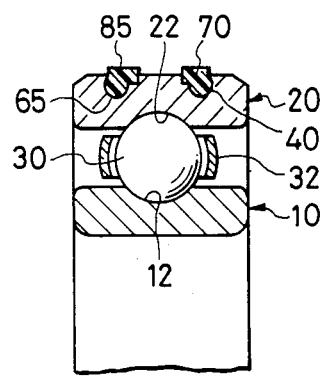
FIG. 1 is a cross-sectional view of an essential portion of an embodiment of the present invention.

A ball bearing shown in FIG. 1 comprises an inner race 10 and an outer race 20 disposed concentrically, a plurality of balls 30 interposed between the two races, a retainer 32 for retaining the balls, and rings 70 and 85 of synthetic resin mounted on the outer race. The inner race 10 is provided with a ball rolling groove 12 in the outer peripheral surface thereof, and the outer race 20 is provided with a ball rolling groove 22 in the inner peripheral surface thereof. The balls 30 are capable of rolling on the rolling grooves.

Two axially spaced circumferential grooves 40 and 65 are provided in the outer peripheral surface of the outer race 20, and ring members 70 and 85 made of synthetic resin are closely held in the respective circumferential grooves. This portion will now be described in detail with reference to FIG. 2. FIG. 2 shows only one (right) circumferential groove 40 and one ring member 70, but the other circumferential groove and the other ring member are formed similarly and arranged symmetrically with respect thereto.

Figure 2:
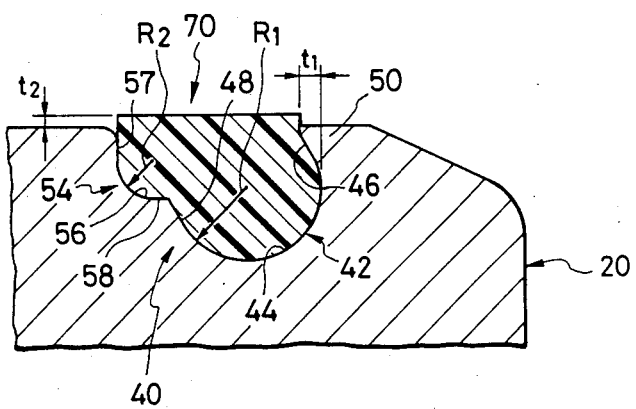
FIG. 2 is an enlarged cross-sectional view of a portion of the embodiment in FIG. 1.

In FIG. 2, the circumferential groove 40 comprises a wide and deep first portion 42 adjacent to one (right) axial end of outer race 20 and a second portion 54 narrower and shallower than the first portion and situated more toward the opposite (left) axial end of the outer race, the first and second portions being formed axially continuously to each other. The first portion 42 is defined by an inclined groove 44 whose bottom is a semicircular surface of radius R1 and whose center of curvature is offset toward the opposite (left) end of the race relative to the lowermost portion (i.e., the central part) of the semicircular groove bottom surface, and an outer side wall 46 and an inner side wall 48 parallel to each other and comprising flat surfaces extending in the direction of the tangential line continuously to the opposite ends of said semicircular surface. The outer side wall 46 and the inner side wall 48 are inclined toward the opposite (left) end of the outer race with increasing radial distance from the outer race axis, and in this sense, the groove 44 is generally inclinded. Also, the side edge of the groove 42 which is adjacent to the one (right) end surface provides a protruding portion 50 which protrudes toward the opposite (left) surface as it progresses radially outwardly, and the amount of protrusion thereof is t1.

On the other hand, the second portion 54 comprises a quadrantal surface 56 of radius R2 (R2<R1) and short planar portions 57 and 58 connected thereto and formed respectively parallel to the radial direction and the axial direction with respect to the outer race, and presents the shape of a stepped groove as a whole.

The ring member 70 is closely held in the circumferential groove 40 by injection-molding synthetic resin in the circumferential groove 40, and the inner peripheral surface thereof is thus of a shape corresponding to the bottom surface of the circumferential groove 40. The ring member 70 fills all the space of the circumferential groove 40 and further protrudes radially outwardly from the outer peripheral surface of the outer race 40 by a height t2.

The bearing is mounted at a predetermined location by fitting the outer race 20 to a housing (not shown) through rings 70 and 85 after the inner race 10 has been mounted on a rotary shaft. Since the ring members 70 and 85 formed of synthetic resin are greater in coefficient of linear expansion than the housing and outer race 20 formed of a metal, even if heat is generated in the housing to expand it during the use of the bearing, the relation of fit between the outer race 20 and the housing will hardly change. This prevents the fit of the outer race to the housing from becoming loose and thus prevents the outer race from rotating with the inner race.

We claim:

1. A bearing including an inner race and an outer race disposed concentrically, a plurality of rolling members interposed between said two races, and first and second ring members of synthetic resin axially spaced on an outer peripheral surface of said outer race and wherein a rotating member is inserted in said inner race and said outer race is fitted and held in a non-rotating member through said first and second ring members, characterized in that:

first and second axially spaced circumferential grooves are provided in said outer peripheral surface of said outer race, each of said circumferential grooves comprises a first portion situated toward a respective one axial end of said outer race and which has a bottom surface that includes an arcuate surface portion of a single radius, and a second portion located more toward the opposite axial end of said outer race than said first portion and being narrower and shallower than said first portion, said first and second portions are formed continuously to each other, said first and second ring members are respectively closely held in said first and second circumferential grooves by injection-molding synthetic resin, and an outer peripheral surface of each of said first and second ring members protrudes radially outward further than said outer peripheral surface of said outer race.

2. A bearing according to claim 1, wherein said first portion of each circumferential groove has a side edge adjacent said respective one end of said outer race and protruding away from that one end.

3. A bearing according to claim 2, wherein a corner of said second portion of each circumferential groove is formed by an arcuate surface of a single radius smaller than said radius of said first portion.

4. A bearing including an inner race and an outer race disposed concentrically, a plurality of rolling members interposed between said two races, and first and second axially spaced ring members of synthetic resin provided on an outer peripheral surface of said outer race and wherein a rotating member is inserted in said inner race and said outer race is fitted and held in a non-rotating member through said first and second ring members, characterized in that:

first and second axially spaced circumferential grooves are provided in said outer peripheral surface of said outer race, each of said circumferential grooves comprises a first groove portion and a second groove portion, said first groove portion includes a bottom surface with a semicircular surface portion having a center of curvature located more away from one axial end surface of said outer race than a central part of said semicircular surface portion, and first and second flat surfaces extending respectively from opposite ends of said semicircular surface portion tangentially to the respective opposite ends of said semicircular surface portion, with a protruding portion extending away from said one axial end surface being formed at a side of said first groove portion which is adjacent to said one end surface of said outer race, and said second groove portion is formed continuously to said first groove portion, more away from said one axial end surface of said outer race than said first groove portion, and includes a quadrantal surface having a radius smaller than said radius of said semicircular surface portion, a third flat surface formed continuous to one end of said quadrantal surface and extending parallel to said outer peripheral surface of said outer race, and a fourth flat surface formed continuous to another end of said quadrantal surface and extending perpendicular to said outer peripheral surface of said outer race, said third flat surface being continuous to said second flat surface of said first groove portion.

5. A bearing including an inner race and an outer race disposed concentrically, a plurality of rolling members interposed between said two races, and first and second axially spaced ring members of synthetic resin provided on an outer peripheral surface of said outer race and wherein a rotating member is inserted in said inner race and said outer race is fitted and held in a non-rotating member through said first and second ring members, characterized in that:

first and second circumferential grooves are situated in said outer peripheral surface of said outer race, respectively toward opposite axial ends of said outer race, each groove comprises a circumferential first groove portion and a circumferential second groove portion which are continuous with one another, with said first groove portion having an arcuate bottom surface portion of a single radius and being nearer than said second groove portion to the one of said axial ends of said outer race toward which that groove is situated, and said second groove portion being narrower and shallower than said first groove portion, and said first and second ring members are tightly held within and conform to the respective first and second groove portions of said first and second grooves, respectively.

6. A bearing according to claim 5, wherein said arcuate bottom surface portion is semicircular.

7. A bearing according to claim 6, wherein said semicircular surface portion is inclinded such that a center of curvature thereof is offset from a central part of said semicircular surface portion in a direction away from said one axial end of said outer race.

8. A bearing according to claim 5, wherein said rings are held in said grooves by injection-molding synthetic resin.

9. A bearing according to claim 5, wherein said second groove portion has a quadrantal corner surface of radius smaller than said radius of said arcuate bottom surface portion and having one end joined to one end of said arcuate bottom surface portion.

10. A bearing according to claim 9, wherein said one end of said quadrantal corner surface and said one end of said arcuate bottom surface portion are joined by a flat surface of said second groove portion which extends parallel to the axis of said outer race and by a flat surface of said first groove portion which joins said flat surface of said second groove portion to said one end of said arcuate bottom surface portion.

11. A bearing according to claim 10, wherein said second groove portion includes an additional flat surface extending from another end of said quadrantal corner surface radially outward to said outer peripheral surface of said outer race.

12. A bearing according to claim 11, wherein said first groove portion has a flat surface extending from another end of said arcuate bottom surface portion away from said one axial end of said outer race so as to provide a protrusion which extends away from that end of said outer race.

13. A bearing according to claim 5, wherein an outer peripheral surface of each of said first and second ring members protrudes radially outward further than said outer peripheral surface of said outer race.

* * * * *